US007857213B2

(12) United States Patent
Ponert

(10) Patent No.: US 7,857,213 B2
(45) Date of Patent: Dec. 28, 2010

(54) SYSTEM HAVING A PLURALITY OF SERVICE FACILITIES WITH ACCESS CONTROL DEVICES

(75) Inventor: Gregor Ponert, Salzburg (AT)

(73) Assignee: SkiData AG, Groedig/Salzburg (AT)

( * ) Notice: Subject to any disclaimer, the term of this patent is extended or adjusted under 35 U.S.C. 154(b) by 526 days.

(21) Appl. No.: 11/982,379

(22) Filed: Nov. 1, 2007

(65) Prior Publication Data

US 2009/0114721 A1 May 7, 2009

(51) Int. Cl.
*G07C 9/00* (2006.01)
*G06K 5/00* (2006.01)

(52) U.S. Cl. ...................................................... 235/382

(58) Field of Classification Search .......... 235/375–382
See application file for complete search history.

(56) References Cited

U.S. PATENT DOCUMENTS

2002/0121545 A1* 9/2002 Eguchi et al. ............... 235/380
2007/0001002 A1 1/2007 Ponert et al.

FOREIGN PATENT DOCUMENTS

DE 102004013965 B3 12/2005
EP 1814088 A1 * 8/2007

* cited by examiner

*Primary Examiner*—Thien M. Le
*Assistant Examiner*—Christle I Marshall
(74) *Attorney, Agent, or Firm*—Flynn, Thiel, Boutell & Tanis, P.C.

(57) ABSTRACT

A system has a plurality of groups of service facilities, each facility having an access control device with a read/write device for a contactless data carrier. The read/write devices of each group are networked with a separate database provided for each group. The data carrier has an identification number and a transaction counter with a transaction number which is changed upon a change of application data stored thereon. The application data, the identification number and the transaction number are stored in the database of the group to which the user goes for access. Upon access to a service facility, only the identification number and the transaction number are read from the data carrier. If the identification number and transaction number match with the identification number and transaction number stored in the database, the application data is retrieved from the database, and in case of a valid access authorization, the access control device permits access without reading application data from the data carrier.

15 Claims, 1 Drawing Sheet

FIG.1
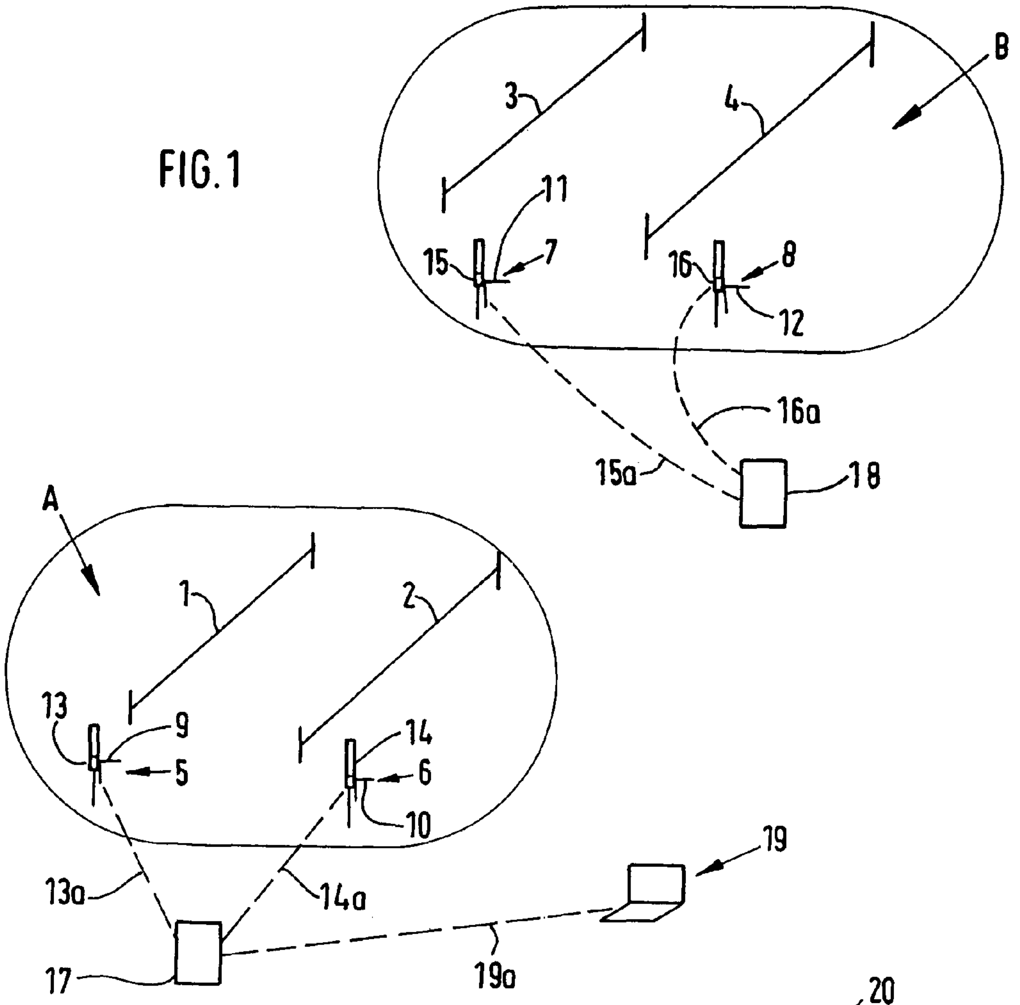
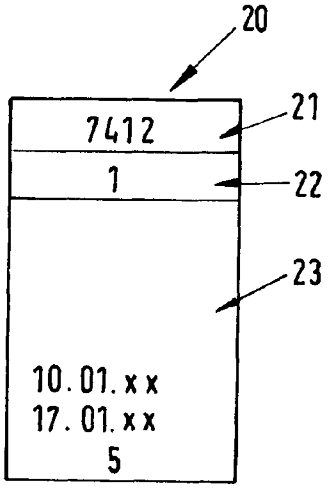
FIG.2

SYSTEM HAVING A PLURALITY OF SERVICE FACILITIES WITH ACCESS CONTROL DEVICES

This invention relates to a system having at least two groups of service facilities on each of which at least one access control device is provided, according to the preamble of claim 1.

In such a system the application data which have been coded on the data carrier by a data input device e.g. at a ticket office are read out from the data carrier by the read/write device. If the read-out application data show a valid right to access the service facility of e.g. a transport facility, such as a ski lift, the access control device releases access to the service facility. The check of the application data can be effected for example by the read/write device which reads out the application data and controls the access control device, or e.g. in the case of an access with a plurality of access lanes with a PC.

The readout of RFID and similar contactless data carriers requires a read time of 100 ms and more for memory-intensive applications, which is felt to be too long and thus annoying. It has therefore been proposed to network all service facilities of e.g. a winter sports area to a central database to which the ticket office is also connected. The application data are then stored in the database by the input device at the ticket office, together with an identification number, for example the serial number of the chip of the RFID data carrier.

Upon access to a control device of this fully networked system, only the serial number of the chip is read out by the read/write device, and the application data stored in the database which are assigned to said serial number are then retrieved online. This permits the read time to be substantially shortened at the access control device.

However, the ski lifts of a winter sports region are often located far apart. Thus, one group of ski lifts can be located in one valley and another group in a far away valley. It is possible to network the ski lifts of the various valleys to a common database. However, the networking of all ski lifts of all valleys requires considerable effort.

It is therefore the problem of the invention to shorten the read time at the access control device in a simple manner when only one data carrier is used in the case of two or more groups of service facilities that are located far apart.

This is obtained according to the invention by the system characterized in claim 1. That is, according to the invention the data carrier which has an identification number is provided additionally with a transaction counter. The application data and a transaction number are written to the data carrier. At the same time, the identification number, the application data and said transaction number are stored in the database of the group of service facilities which the user with the data carrier goes to. Upon access to a service facility of said group, the identification number and the transaction number from the transaction counter of the data carrier are read out by the read/write device of the access control device of the service facility and in case of a match of the read identification number and transaction number with the identification number and transaction number stored in the database there is effected—instead of the reading and check of the application data from the data carrier—a readout of the application data from the database and a subsequent check of the application data, the access control device releasing access in case of a valid access authorization check.

The check of the application data can be effected for example directly by the read/write device which controls the access control device, by a PC or similar computer which, in particular in the case of an access with a plurality of access lanes each having an access control device with a read/write device, controls a plurality of access control devices, or directly by the server of the database.

The transaction counter and the identification number of the data carrier are thus used jointly as a key for the database of the particular group of service facilities. When the user with the data carrier stays within the area of said group, it is thus sufficient to read the serial number and transaction number from the data carrier with the read/write device at the access control device. This permits the read time to be shortened for example to 25 ms to 50 ms or less.

Upon a change of the application data the transaction number is changed, and the changed application data stored, in the database with which the read/write device is networked which reads out the data carrier, and the changed transaction number stored on the transaction counter of the data carrier, together with the changed application data.

The service facilities can be e.g. transport facilities, such as ski lifts. However, they also include other facilities, for example other sports, entertainment and food-serving facilities and the like.

While the service facilities and their read/write devices of each group are adjacent to each other and networked with a common database, the groups can be located far away from each other without additional effort according to the invention. Thus, one group can involve ski lifts or similar transport facilities in one valley, and the other group ski lifts and the like in a far away valley.

Since the data transmission speed is substantially lower with non-contact-type data carriers than with contact-type data carriers, the invention is intended in particular for contactless data carriers, in particular RFID data carriers. It is suitable primarily for "hands free" data carriers with a data transmission distance of more than 100 mm. The one-to-one identification number of the data carrier is preferably the serial number of the chip of the RFID data carrier.

The access control device can be a revolving gate, a light barrier or another person singling device. The release of access with a revolving gate can be effected by the blocked revolving gate being transferred to the release position or the revolving gate located in the release position remaining open. The invention has proved to be particularly suitable for an access control device according to German patent no. 10 2004 013 965. Here, two antennas are provided one after the other at the access, the access control device being driven in dependence on the reading by the first and second antennas as well as the detection of a person by a people sensor.

With said access control device the time duration for reading the data carrier is reduced to a particularly short period of time, namely the period of time in which the area of the first antenna is passed.

The storing of the application data, the identification number and the transaction number of the transaction counter of the data carrier in the database can be effected in different ways.

If the database does not contain an entry with the identical identification number and the identical transaction number, the application data, the identification number and the transaction number can be read out by the read/write device of an access control device of the particular group and stored on the database with which said read/write device is networked.

It is preferable to provide e.g. at a ticket office or similar point of sale a data input device which is networked with the database of the adjacent group of service facilities. It is thereby possible e.g. upon purchase of the data carriers or of access authorizations to use the data input device at the ticket office to code the application data on the data carrier and store a transaction number on the transaction counter of the data carrier, on the one hand, and simultaneously store the identification number, the application data and the transaction number in the database of said group, on the other hand.

The data input device also can be constituted by a PC or similar terminal which is connected to the database e.g. via the Internet. The identification number can be provided visibly on the data carrier or be read out by the data input device.

When the database with which the read/write device is networked which reads out the data carrier is not connected to a data input device, however, the application data, the identification number and the transaction number which have been read out from the data carrier by the read/write device are stored in the database.

The invention is suitable in particular for data carriers with an access authorization extending over a certain time period, for example for commutation tickets, such as multi-hour, half-day, day, multi-day, weekly, monthly or season tickets. The data carrier can of course for this purpose be configured in a manner other than a card, for example in the form of a wrist watch. It may have a period of validity, e.g. a day, or e.g. two half-days. Said periods of validity then constitute a component of the application data. When the period of validity changes, e.g. the first half day is utilized for the data carrier storing altogether two half days, this changes the application data. The changed application data are stored with a changed transaction number in the database and by the read/write device on the data carrier. That is, the transaction number is changed at each write procedure with a read/write device.

Upon a change from one group of service facilities to another group on the first half day, the identification number, the changed application data and the changed transaction number of the transaction counter are then read out by a read/write device of the other group and stored in the database of said group.

The invention is particularly suitable for so-called flexipasses. Here the access authorization data define a total period of validity and within the total period of validity one or more single periods of validity for use of the service facilities of the groups comprised by the system. The data carrier involved may for example be valid for altogether one week but within this week for example only on five days or seven half days or similarly limited single periods of validity.

According to the invention, the data carrier must thus be read when writing must be done outside the network of one group of service facilities. If the data carrier stays within a group, however, it is sufficient to read the identification number and the transaction number.

The transaction number can be constituted by a memory location on the data carrier which is overwritten with a new transaction number upon a change of the application data. Instead, the transaction counter can be constituted by a counting logic integrated into the data carrier, causing the transaction number to be changed either automatically or by command upon a change of the application data.

The application data comprise e.g. besides the total period of validity and/or single periods of validity all data that the data carrier needs for carrying out the access control.

That is, according to the invention there is applied to each data carrier a transaction counter which is used together with the one-to-one identification number, e.g. the serial number of the data carrier, as a key for the central database of each network of a group of service facilities.

The data carrier is written with the application data for example first at the point of sale and subsequently by the read/write device of an access control device whenever charged, i.e. the transaction number on the transaction counter is changed. The application data plus identification number plus transaction number are stored in the database of the network of the particular group.

The reading by the read/write device of an access control device comprises the reading of the identification number and the transaction number from the data carrier. This is followed by the query in the database of the particular network. If an entry with an identical combination of identification number and transaction number is present in the database, the application data from the database are used for the further transaction. If no entry with an identical combination of identification number and transaction number is present in the database, however, the application data are read out from the data carrier by the read/write device. That is, if the data carrier stays within the network of one group of service facilities it suffices to read the identification number and the transaction number from the data carrier with the read/write device.

Hereinafter the invention will be explained in more detail by way of example with reference to the enclosed drawing. Therein is shown schematically:

FIG. 1 a winter sports region with two skiing areas; and

FIG. 2 a data carrier.

According to FIG. 1, two groups of service facilities, namely the skiing areas A and B, with ski lifts 1 and 2 or 3 and 4 or similar transport facilities are provided. The skiing areas A and B constitute a winter sports region.

Each ski lift 1 to 4 is provided with an access control device 5 to 8 with a turnstile 9 to 12 or similar person singling device which has a read/write device 13 to 16. FIG. 1 shows at each lift 1 to 4 only one control device 5 to 8 with a turnstile 9 to 12 and a read/write device 13 to 16. However, there can also be provided at a lift a plurality of access lanes each with an access control device with a read/write device.

The read/write devices 13, 14 of the group A and the read/write devices 15, 16 of the group B are networked with a database 17 or 18 via lines 13*a* to 16*a*. The database 17 of the group A is furthermore connected via the line 19*a* to the data input device 19, e.g. of a ticket office where the data carrier 20 is purchased.

According to FIG. 2, the data carrier 20 has an identification number 21, e.g. the serial number of the chip of the RFID data carrier, for example "7412". The data carrier 20 is provided with a transaction counter 22. Upon purchase of the data carrier 20 a transaction number, e.g. "1", is stored in the transaction counter 22 by the data input device 19, along with the application data 23 including the validity data. The identification number and the application data in the electronic data carrier 20 are stored in binary form, as usual, as is the transaction number.

If e.g. a flexipass is involved, i.e. an access authorization that is valid e.g. for five days within a week (seven days), the application data comprise as validity data for example the date of the first day, e.g. "10 January XX", and of the last day, e.g. "17 January XX", the total period of validity of the data carrier as well as the days or single periods of validity "5" when the data carrier 20 is valid within the total period of validity. The transaction number of the transaction counter 22 is assigned to the days or single time periods as a reference.

The identification number 21 ("7412"), the transaction number ("1") and the application data 23 including the periods of validity (valid for 5 days in the time period from 10 January to 17 January XX) are transmitted upon purchase of the data carrier 20 by the data input device 19 at the same time to the database 17 of the skiing area A and stored there.

When the skier with the thus coded data carrier 20 goes for example to the lift 1 to go skiing in the skiing area A on 10 January XX, the read/write device 13 of the access control device 15 reads the identification number 21 ("7412") and the transaction number ("1") from the transaction counter 22. By accessing the lift 1 the skier has utilized the first day of the five days on which the data carrier 20 is valid. The data carrier 20 is thus valid for only four further days. In the database 17 an update of the application data is therefore carried out, and the transaction number "2" is assigned to the changed application data. At the same time the changed application data are stored in the data carrier 20 by the read/write device 13, as is the transaction number "2" in the transaction counter 22 of the data carrier 20.

Upon another access to one of the lifts 1, 2 of the skiing area A on the first day, the read/write device 13 or 14 of the access control device 5 or 6 reads out the identification number 21 and the transaction number "2" of the transaction counter 22 from the data carrier 20 and in case of a match of the read identification number 21 and transaction number with the identification number and transaction number stored in the database 17 the application data are read out of the database 17 and the read-out application data are checked as to whether they contain a valid access authorization. If this is the case, the turnstile 9 or 10 is driven so as to release access to the lift 1 or 2. The check of the application data for a valid access authorization can be effected by the read/write device 13 or 14 which also drives the turnstile 9 or 10.

The data transmission between the read/write device 13 and the database 17 is effected online and thus very fast. On the first skiing day the transaction number ("2") and the identification number 21 ("7412") thus constitute the key to access to the ski lifts 1, 2 in the skiing area A. It is thus only necessary that the identification number 21 and the transaction number of the transaction counter 22 are read out from the data carrier contactlessly by the read/write device 13, so that the read time is reduced to for example 25 ms to 50 ms.

When the skier goes skiing again for the first time after three days, e.g. on 13 January XX, going e.g. to the lift 3 in the skiing area B, the read/write device 15 of the access control device 7 transmits the identification number 21 and the application data 23 to the database 18 upon access to the lift 3. Since the access authorization data have changed, namely only three more days within the remaining period of validity up to 17 January XX, the transaction number is changed e.g. to "3" in the database 18 and the changed transaction number stored in the transaction counter 22 of the data carrier 20, together with the changed application data 23.

Upon each further access to one of the lifts 3, 4 of the skiing area B on the same day, it is thus only necessary that the identification number 21 and the transaction number on the transaction counter 22 of the data carrier 20 are read by the read/write device 15, 16 of the access control device 7, 8, matched with the identification number and transaction number stored in the database 18, the application data read out of the database 18 and checked for a valid access authorization by the read/write device 15, 16.

If the skier changes from the skiing area B to the skiing area A, e.g. to the lift 2, on the same day, that is, on 13 January XX, the identification number 21, the changed transaction number ("3") of the transaction counter 22 and the changed application data 23 of the data carrier 20 are read from the data carrier 20 by the read/write device 14 of the access control device 6 and stored in the database 17. Upon each further access to one of the lifts 1, 2 of the skiing area B on the same day, it is then only necessary that the identification number 21 and the transaction number on the transaction counter 22 of the data carrier are read by the read/write device 13, 14 of the access control device 5, 6 and matched with the identification number and transaction number stored in the database 17, the application data read out of the database 17 and checked for a valid access authorization by the read/write device 13 or 14.

That is, only if the skier changes from the skiing area A to the skiing area B or from the skiing area B to the skiing area A is it necessary that the application data 23, including the authorization data 24, of the data carrier 20 are read and stored in the particular database 17, 18, while if the skier stays within the skiing area A, B to which he has changed it is only necessary, upon each further use of the lifts 1, 2 or 3, 4 of said skiing area A, B, that the identification number 21 and the transaction number of the transaction counter 22 are read out by the read/write device 13, 14 or 15, 16 to read out the application data from the database 17, 18.

The invention claimed is:

1. A method for access control to at least two groups of transport facilities, each group having a separate database, each transport facility including at least one access control device having at least one read/write device for reading data carriers, the read/write devices of each said group being networked with the respective database, the data carrier having an identification number, and application data stored on the data carrier, including the steps of:

providing the data carrier with a transaction counter for storing a transaction number which is changed upon a change of the application data, storing the application data, the identification number and the transaction number of the transaction counter of the data carrier in the database of the group of the transport facilities that the user goes to initially, upon access to a transport facility of said group, reading the identification number and the transaction number from the transaction counter of the data carrier with the read/write device, in case of no match of both the identification number read out from the data carrier and the transaction number read out from the transaction counter of the data carrier with the identification number and the transaction number stored in the database, retrieving the application data from the data carrier, and in case of a match of both the identification number and the transaction number, along with the application data stored in the database indicating a valid access authorization, operating the particular access control device to provide access without reading the application data from the data carrier, wherein upon changing from one group to another group of transport facilities, the read/write device of the transport facility of the another group to which the user has changed, reading the identification number and the transaction number of the transaction counter, when the identification number or the transaction number does not match, reading the application data from the data carrier, and providing access with the access control device, so long as the application data includes a valid access authorization.

2. The method according to claim 1, wherein when one of the numbers does not match, storing updated application data, the identification number and an updated transaction number for the transaction counter of the data carrier in the database of the respective group.

3. The method according to claim 1, including updating the transaction number in the transaction counter of the data carrier either automatically or by command through a counting logic integrated into the data carrier in response to a change of the application data.

4. The method according to claim 1, wherein the database of the one group of the transport facilities is not in communication with the database of another said group of transport facilities.

5. A system for controlling access comprising:

at least two groups of transport facilities, at least one access control device for each transport facility, and at least one read/write device provided for each said access control device for reading data carriers; and a separate database for each said group of transport facilities that is networked with the read/write devices of the respective group of transport facilities, and a data carrier having an identification number, and application data stored thereon, and the data carrier including a transaction counter with a transaction number that is changed upon a change of the application data.

6. The system according to claim 5, including a data input device for providing the application data to the data carrier and providing a transaction number in the transaction counter of the data carrier.

7. The system according to claim 6, wherein the data input device is networked with the database of one group of the transport facilities, and the application data, the identification number and the transaction number are stored by the data input device in the database with which the data input device is networked.

8. The system according to claim 5, wherein the application data comprises one or more periods of validity for use of the transport facilities of the groups of the system.

9. The system according to claim 8, wherein the application data comprises a total period of validity and within the total period of validity one or more single periods of validity for use of the transport facilities of the groups.

10. The system according to claim 5, wherein the data carrier comprises a non-contact-type data carrier.

11. The system according to claim 5, wherein the transaction counter includes a memory location on the data carrier that is overwritten with a new transaction number upon each change of the application data.

12. The system according to claim 5, wherein the access control devices comprise person singling devices.

13. A method for access control comprising:

providing at least first and second groups of plural transport facilities, each of the transport facilities including at least one access control device having a corresponding read/write device for reading data from data carriers;

providing a separate database for each group configured to network with the read/write devices of the transport facilities of the group;

providing a data carrier having an identification number and a transaction counter to a user for access purposes;

inputting a transaction number to a transaction counter and providing application data to the data carrier for storage thereon to store a valid access authorization for the user of the data carrier;

providing the identification number, the transaction number and the application data to the database for the first group of transport facilities;

reading the identification number and the transaction number from the data carrier with the read/write device corresponding to the one transport facility of the first group as a user is attempting entry at the one transport facility of the first group of transport facilities;

comparing the identification number and the transaction number from the data carrier with the corresponding numbers stored in the database for a match;

in response to a match:

determining whether the application data stored in the database contains a valid access authorization, without reading the application data from the data carrier; and controlling the corresponding access control device to allow entry to the one transport facility after the access authorization is validated;

in response to no match:

reading the application data from the data carrier;

determining whether a change is needed in the application data stored in the database;

when a change in the application data is needed, updating the application data and the transaction number in the database and writing the updated transaction number and the updated application data onto the data carrier with the read/write device;

when no change in the application data is needed, providing no changes to the application data stored in the database or stored in the data carrier;

upon a subsequent access attempt by a user entering one of the first group of transport facilities on the same day, reading the identification number and the transaction number from the data carrier with the read/write device corresponding to the one transport facility;

comparing the transaction number and the identification number with the corresponding numbers stored in the database for a match;

in response to a match, determining whether the application data stored in the database contains a valid access authorization without reading the application data from the data carrier; and controlling the corresponding access control device to allow entry to the one transport facility after the application data is validated, without writing to the data carrier, wherein the read time and write time for the read/write device corresponding to the one transport facility having the access control device is reduced by minimizing the reading or writing of application data from the data carrier.

14. The method for access control according to claim 13, comprising the steps of:

for a user subsequently attempting entry of the transport facility of the second group of transport facilities, reading the identification number and the transaction number from the data carrier with a read/write device corresponding to a transport facility of the second group;

comparing the identification number and the application data read from the carrier to a database of the second group of transport facilities;

in response to one of the identification number and the transaction number not matching, reading the application data from the data carrier;

determining from the application data whether there is a valid access authorization;

in response to the determination of a valid access authorization, writing updated application data and an updated transaction number, if necessary, onto the data carrier with the read/write device;

controlling the corresponding access control device to allow entry to the one transport facility of the second group of transport facilities after the application data is validated.

15. The method for access control according to claim 14, comprising the steps of:

upon a subsequent access attempt by a user entering one of the second group of transport facilities on the same day, reading the identification number and the transaction number from the data carrier with the read/write device corresponding to the one transport facility of the second group of transport facilities;

sending the identification number and the transaction number read by the read/write device to the database of the second group of transport facilities;

comparing the transaction number and the identification number with the corresponding numbers stored in the database of the second group for a match;

in response to a match, determining whether the application data stored in the database contains a valid access authorization, without reading the application data from the data carrier; and controlling the corresponding access control device to allow entry to the one transport facility of the second group of transport facilities after the application data is validated, without writing to the data carrier, wherein the read time and write time for the read/write device corresponding to the one transport facility of the second group of facilities, having the access control device is reduced.

* * * * *